INVENTOR.
WATSON F. WALKER
BY Martin L. Kacher
ATTORNEY

INVENTOR.
WATSON F. WALKER
BY [signature]
ATTORNEY

INVENTOR.
WATSON F. WALKER
BY Martin LuKacher
ATTORNEY

INVENTOR.
WATSON F. WALKER
BY Martin LuKacher
ATTORNEY

United States Patent Office 3,409,831
Patented Nov. 5, 1968

3,409,831

COMMUNICATIONS SYSTEM UTILIZING CORRELATION DETECTION TECHNIQUES

Watson F. Walker, Pittsford, N.Y., assignor to General Dynamics Corporation, a corporation of Delaware Filed Mar. 9, 1964, Ser. No. 350,383
11 Claims. (Cl. 325—65)

ABSTRACT OF THE DISCLOSURE

A communication system for transmitting and receiving frequency differential phase shift keyed signals which are adapted to be transmitted over a communication link subject to fading, multipath or other distortion between transmission and reception is disclosed. At the receiving terminal modulated information tones and demodulated reference tones are separated and information derived therefrom by correlation detection techniques. Before correlation detection, the spectrum of the modulated and demodulated tones are both broadened by separate compensating filters in channels which pass the received modulated and reference tones. The effect of correlation detection of a broadened signal spectrum is a decrease in error probability below the limiting value of error probability attained by the system at high signal to noise ratios.

The present invention relates to communications systems, and particularly to digital information communications systems.

The invention is especially suitable for use in systems of the type where information bearing signals are transmitted simultaneously with a reference signal from a transmitting terminal over a communications link to a receiving terminal, the signals being subject to fading, multipath or other distortion between transmission and reception. The information may be derived from the information bearing signal by correlating that signal with the reference signal or with signals derived at the receiving terminal from the transmitted reference signal. Reference may be had to U.S. Patent No. 3,036,157, issued May 22, 1962 to George A. Franco and Gerard Lachs for a detailed discussion of an exemplary system of the foregoing type. The invention, however, may also be generally useful in information and signal handling apparatus using correlation detection techniques. Such techniques are also known as matched filter detection techniques. By correlation, as used herein, is meant the degree of relationship between the waveforms of two signals, over a certain period of time, and may be expressed mathematically as $$Z=\frac{1}{T}\int_0^T q(t)p(t)dt \qquad (1)$$

where, Z is a number representing the correlation; T is the period of time; and $q(t)$ and $p(t)$ are functions of time, respectively representing the two signals.

Signals transmitted over certain communications links, particularly high frequency radio paths, are subject to distortion principally due to noise, fading and multipath effects. The information carried by the transmitted signal is difficult to recover because of such distortion and the reliability of the communications system therefore suffers. Increasing the strength of the transmitted signals may be insufficient to improve reliability, since contributions to distortion other than noise limit the extent to which reliability can be increased. For example, the error probability $P_e$ of a communications system in transmitting and receiving a binary bit is a measure of the reliability of the system. It has been experimentally found that this error probability, in general, does not decrease indefinitely with increasing signal strength. Instead, a limiting value of $P_e$ is reached which is substantially independent of increased strength of the transmitted signal. Distortion of the reference signal, the information signal or both because of random delay perturbations and dispersions, which can largely be attributed to fading and multipath effects on long range radio paths, can result in errors in communications systems using correlation detection techniques. Thus, reliability of such systems is limited in spite of high signal strength and correspondingly high signal to noise ratio.

Accordingly, it is an object of the present invention to provide an improved communications system wherein the foregoing difficulties and disadvantages are substantially eliminated.

It is a further object of the invention to provide an improved communication system which provides more reliable communications that known communications systems in spite of distortion as may be caused by fading and multipath effects on high frequency radio paths.

It is a still further object of the invention to provide an improved communications system and/or an improved receiver for such communication system which system and/or receiver is operative to derive information in accordance with correlation detection techniques.

It is a still further object of the present invention to provide an improved communications system of the frequency differential type, by which is meant, a system wherein a modulated tone and another tone closely adjacent in frequency thereto are simultaneously transmitted and received.

It is a still further object of the present invention to provide an improved receiver which derives information by correlation detection and which provides, in a single receiver, the effectiveness of a diversity receiver.

Briefly described, a communication system embodying the invention includes a transmitting terminal from which modulated and unmodulated signals may be transmitted simultaneously. At a receiving terminal, the transmitted signals are separated and a correlation detection technique is used to derive an output representing information which is transmitted. However, before correlation detection, the spectrum of the signal bearing the information is broadened. This may be accomplished, according to an embodiment of the invention, by separate compensating filters in channels which pass the received modulated and unmodulated signals. The effect of correlation detection of a broadened signal spectrum is a decrease in error probability below the limiting value of error probability attained by the system at high signal to noise ratio. Thus, the reliability of the system is increased.

The invention itself, both as to its organization and method of operation, as well as the foregoing and other objects and advantages thereof, will be more fully apparent from a reading of the following description in connection with the accompanying drawings in which.

Figure 1:
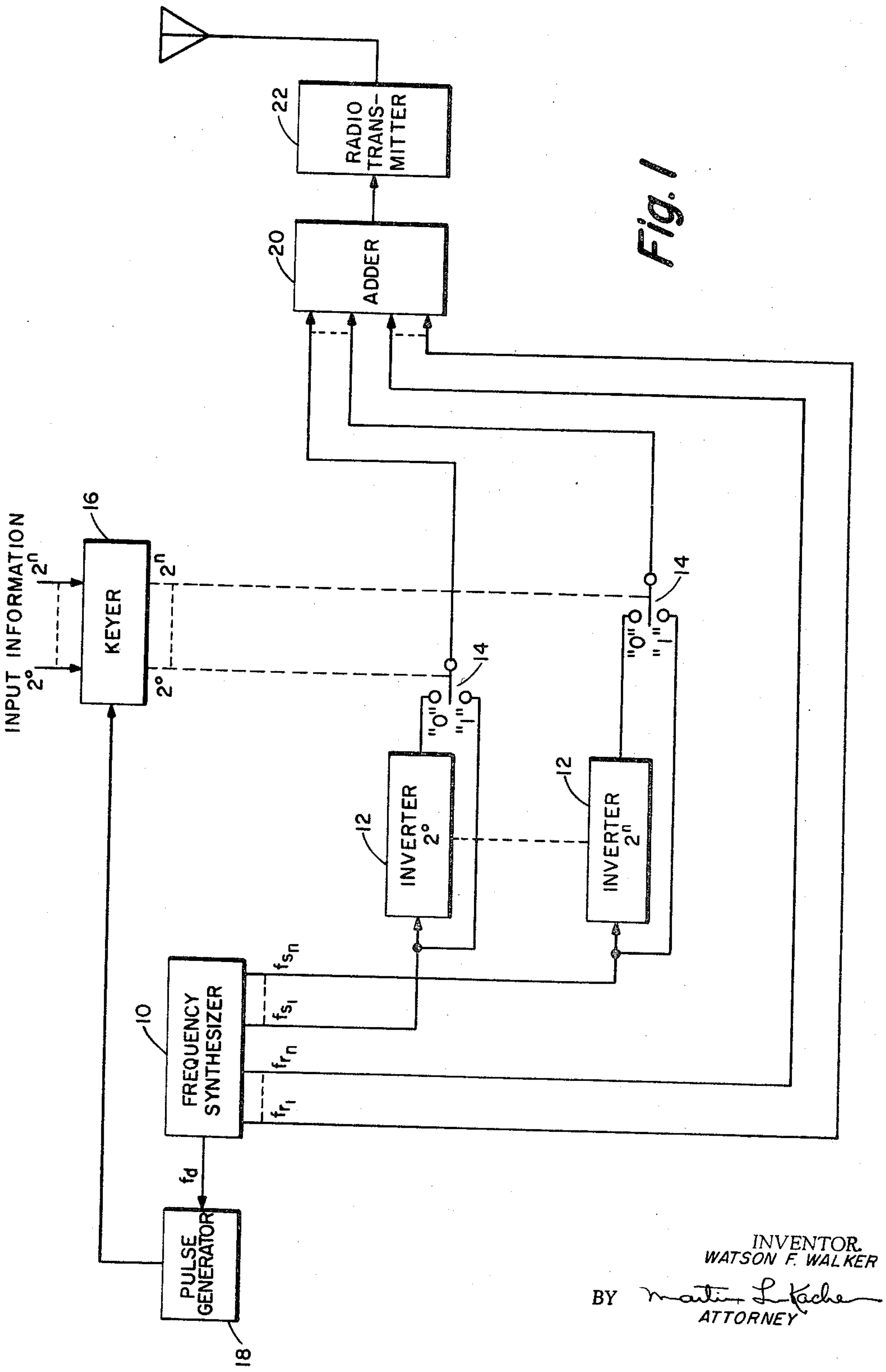
FIG. 1 is a block diagram of that portion of a communication system embodying the invention which is located at a transmitting terminal.

Referring more particularly to FIG. 1 there is shown a frequency synthesizer 10 which generates a plurality of signals. Such synthesizers are known in the art and may include a crystal oscillator, and multiplier, divider and mixer circuits which provide a number of sinusoidal waves of different frequency all of which are hormonics of a wave of given frequency, $f_d$. By way of example this frequency $f_d$ may be twenty-five cycles per second. The other signals may be reference signals having frequencies $f_{r_1}$, $f_{r_2}$, - - - $f_{r_n}$, and information signals having frequencies $f_{s_1}$, $f_{s_2}$, - - - $f_{s_n}$. The number of reference and information signals generated depends on the number of bits of digital information which are transmitted. Each information signal transmits a separate bit. One reference signal is provided for each pair of information signals. However, more or fewer information signals may share the same reference signal if desired.

The frequencies of the signals may have the following relationships:

$$T=1/f_d \qquad (2)$$

where T is the period of the given frequency wave.

$$f_r=(N+n)f_d \qquad (3)$$

where N may be any integer, for example 2500, and $n$ has values of 0, 3, 5, and successively higher odd integers.

$$f_{s_1}=f_{r_1}-f_d \qquad (4)$$

$$f_{s_2}=f_{r_1}+f_d \qquad (5)$$

$$f_{s_{n-1}}=f_{r_n}-f_d \qquad (6)$$

$$f_{s_n}=f_{r_n}+f_d \qquad (7)$$

Thus the frequenies of the information signals are the harmonics of $f_d$ which are immediately adjacent to the frequency of their respective reference signal. The synthesizer also generates a tone of $f_d$. The information signals are modulated in accordance with input information in the form of a word containing a number, say $n$, binary bits $2^0$, $2^1$, - - - $2^n$. Inverter circuits 12 and keying switches 14 are provided for each information signal frequency $f_{s_1}$, $f_{s_2}$, - - - $f_{s_n}$. Only those inverters and keying switches corresponding to the information signals of frequency of $f_{s_1}$ and $f_{s_n}$ have shown to simplify the illustration.

A binary "1" and a binary "0" bit are respectively represented by phase reversal of the information signals in the inverter circuits 12. These inverter circuits 12 may be unity gain amplifiers. The reference signals of frequency $f_{r_1}$, $f_{r_2}$, - - - $f_{r_n}$ are not reversed in phase so that the phase relationship between information signals and their respective reference signals represents the input information bits.

The keying switches 14 are controlled by a keyer 16 to which the input words are applied. This keyer 16 is designed in accordance with the known digital logic design techniques and responds to an output pulse from pulse generator 18 which is triggered by the wave of given frequency $f_d$ generated by the synthesizer 10. Different words constituted of different combinations of bits $2^0$ to $2^n$ may arrive in synchronism with the pulses from the pulse generator 18 and voltage levels corresponding to these bits may have durations equal to the period T of the given frequency wave. The keying interval, that is, the length of time the keying switches remain at the "0" or at the "1" terminals thereof is equal to the period T.

Figure 5:
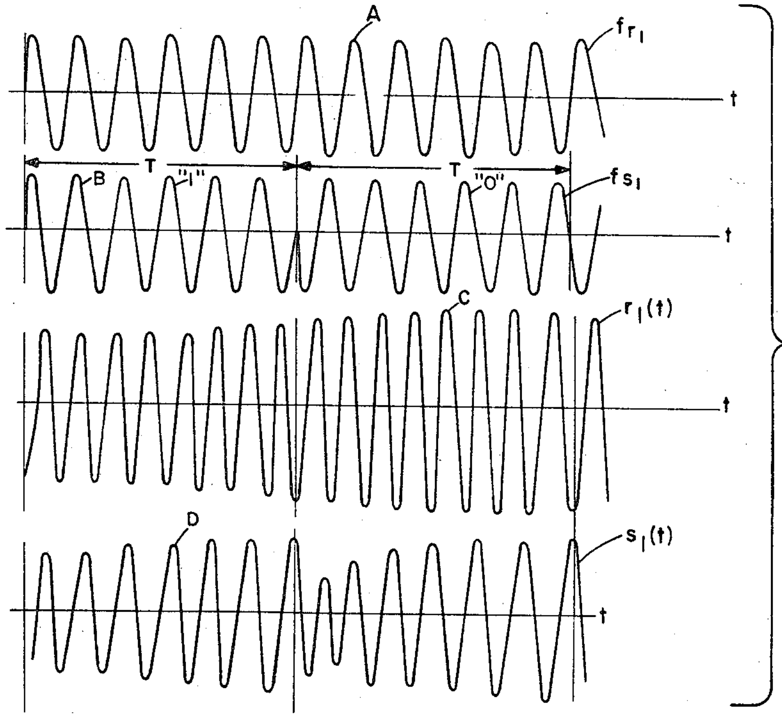
FIG. 5 is a series of exemplary waveforms of signals in the system shown in FIGS. 1 and 2.

FIG. 5 illustrates the waveform of the reference signal $f_{r_1}$ (see waveform A of the FIG. 5) and the waveform of the information signal of frequency of $f_{s_1}$ (see waveform B of FIG. 5). The reference signal is not subjected to phase reversal whereas the information signal ($f_{s_1}$) is reversed in phase to represent binary "1" and binary "0" bits. The keying interval is equal to the period of the given frequency tone T. The reference signal and the information are in phase to represent a binary "1" bit and out of phase with each other to represent a binary "0" bit. Adder circuit 20, which may be a resistive network, combines the information signals (after phase reversal modulation) and the reference signals with each other to form a common output signal. In a radio transmitter 22, the output signal from the adder 20 modulates a high frequency carrier so that the information and reference signals are simultaneously transmitted from a transmitting terminal to a receiving terminal.

Figures 2, 3:
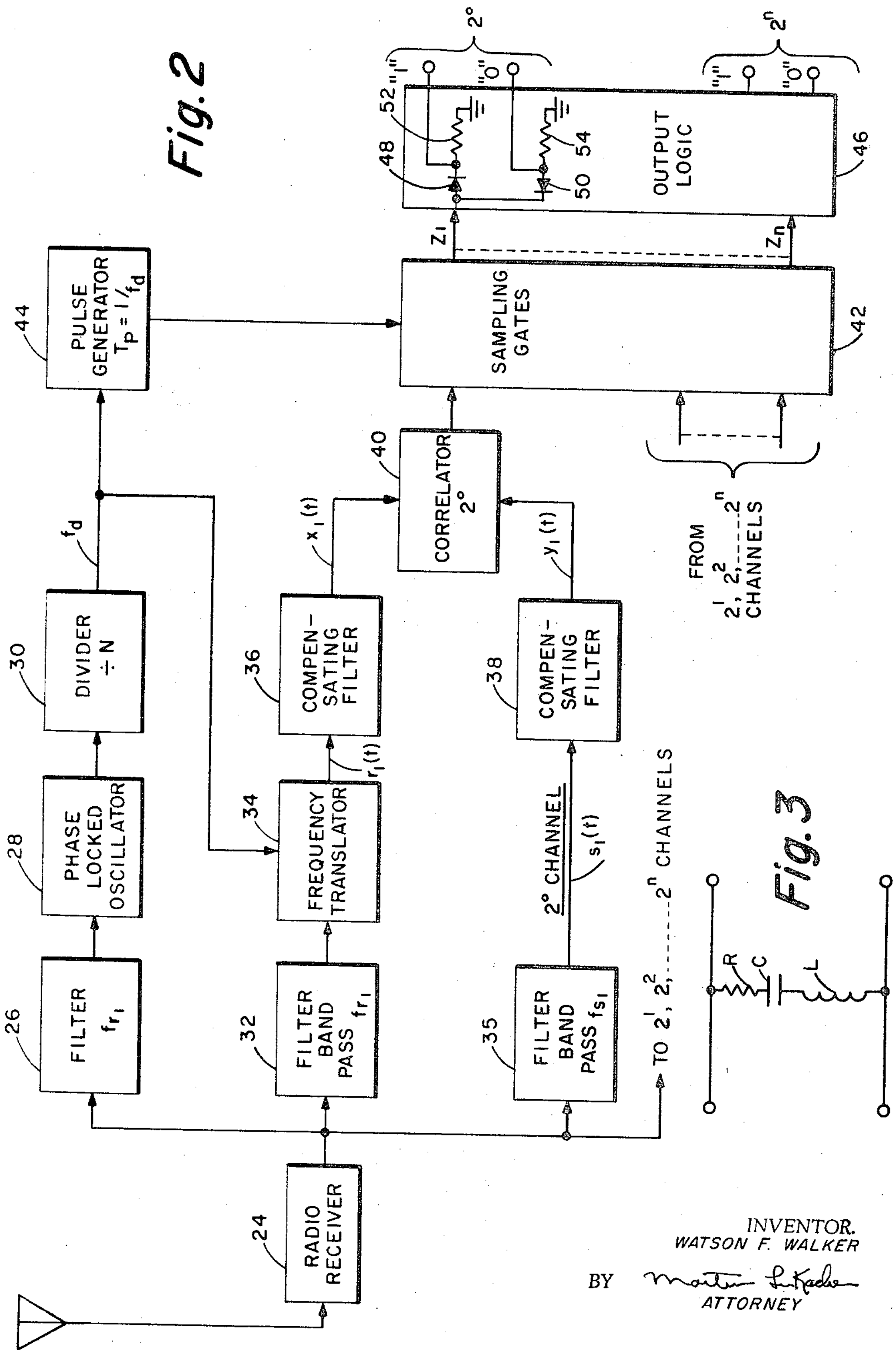
FIG. 2 is a block diagram of that portion of the communication system embodying the invention which is located at a receiving terminal.
FIG. 3 is a schematic diagram of one of the compensating filters shown in FIG. 2.

The transmitted signals are received at the receiving terminal by a radio receiver 24 (FIG. 2). The receiving terminal and the transmitting terminal may be thousands of miles apart from each other. Thus, the transmitted signals are subject to distortion due to noise, fading, multipath and other effects during their transmission. The radio receiver 24 includes demodulating circuits which detect the signal which modulated the transmitted carrier. The output of the receiver 24 covers the band of frequencies from $f_{s_1}$ to $f_{s_n}$. The wave of given frequency $f_d$ is derived by passing the detected radio receiver signal through a filter 26 which passes the lowest frequency reference signal of frequency $f_{r_1}$. The output of this filter 26 synchronizes a phase-locked oscillator 28. Slow variations in the frequency of the reference signal which may be due to multipath and fading effects are substantially eliminated by the action of the oscillator 28.

The output of the phase locked oscillator, which is of frequency $f_{r_1}$, is divided by N in a frequency divider circuit 30 to provide the given frequency wave $f_d$ the average phase or frequency of which is the same as the frequency of the wave of frequency $f_d$ generated by the frequency synthesizer 10 (FIG. 1). The digital information bits are extracted from the detected radio receiver output in separate channels respectively for the $2^0$, $2^1$, - - - $2^n$ bits. Separate band pass filters at the input ends of these channels select different ones of the information and reference signals. The channel which extracts the first information bit $2^0$ is shown in FIG. 2. Other channels provided for in the $2^1$, $2^2$, - - - $2^n$ bits are not shown in detail to simplify the drawing. Filters 32 and 35 extract the reference signal of frequency $f_{r_1}$ and the information signal of frequency $f_{s_1}$, respectively. Each filter 32 and 35 has a pass-band sufficient to pass most of the components of the reference and information signals. This passband may be 25 cycles per second on each side of $f_{s_1}$ and $f_{r_1}$.

The locally generated wave of given frequency $f_d$ is subtracted from the reference signal $f_{r_1}$ in a frequency translator 34 (a balanced modulator circuit followed by filtering circuits, for example) to provide an output signal which may be expressed as a function $r_1(t)$. This output signal which has the same approximate mean frequency as the information signal at the output of the filter 35; namely the frequency $f_{s_1}$. The output signal of the filter 35 may be expressed as a function $s_1(t)$ of similar form to the function $r_1(t)$.

Both the reference signal and the information signal are subject to distortion during the transmission and are distorted both in amplitude and phase. The resulting reference signal $r_1(t)$ at the output of the translator 34 is illustrated by way of example in waveform C of FIG. 5 and the resulting information signal $s_1(t)$ is illustrated in waveform D of FIG. 5. The phase distortion effectively spreads the frequency spectrum of the information and reference signals. The spectrum of the reference signal $r_1(t)$ in terms of its normalized power density is plotted in curve A of FIG. 4. The over-all width of the spectrum is limited by the band phase filter 32 which passes the spectrum about $f_{r_1}$. This filter 32 serves to eliminate the noise which is primarily present about the skirts of the spectrum. The spectrum of the information signal $s_1(t)$ is similar in form and therefore is not illustrated.

Figure 4:
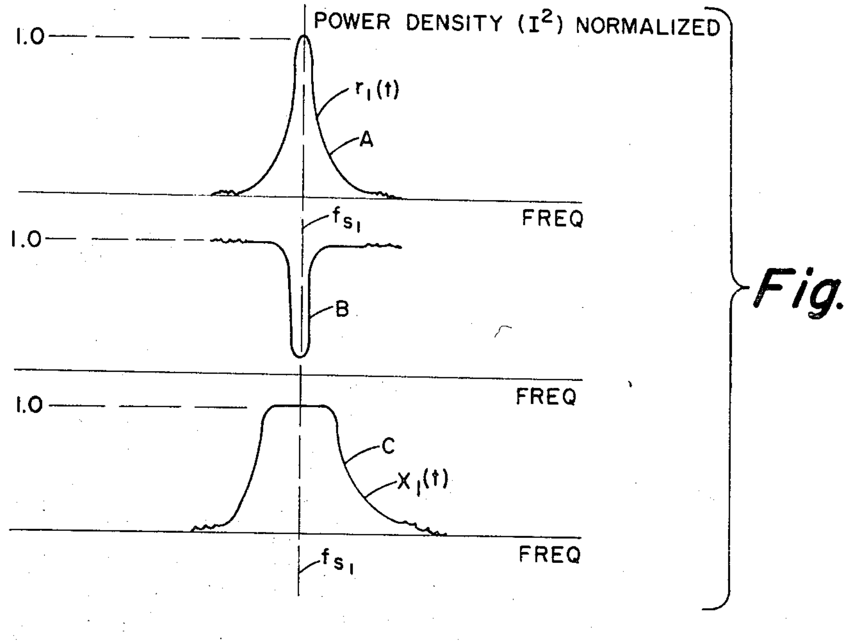
FIG. 4 is a group of curves illustrating the power spectrum of the signals and the power transfer characteristic of the compensating filters in the portion of the system shown in FIG. 2.

The reference signal $r_1(t)$ and the information signal $s_1(t)$ are respectively applied to similar compensating filters 36 and 38 which process the signals by broadening the spectra thereof. The transmission characteristic in terms of power density transmitted vs. frequency of these filters is plotted in curve B of FIG. 4. There is an inverse relationship between the power density vs. frequency characteristic of the signals $r_1(t)$ and $s_1(t)$ and the transmission characteristic in terms of power density transmitted vs. frequency of the filters 36 and 38. The resultant signals after processing in the compensating filters 36 and 38 may be expressed as the functions $x_1(t)$ and $y_1(t)$ respectively, $x_1(t)$ corresponding to $r_1(t)$ and $y_1(t)$ corresponding to $s_1(t)$. The spectrum of the processed reference signal $x_1(t)$, as indicated in curve C of FIG. 4 is appreciably broadened as compared to the waveform of the reference signal $r_1(t)$ before processing in the compensating filter 36. The spectrum of the processed information signal $y_1(t)$ is similarly broadened as compared to the spectrum of the information signal $s_1(t)$.

The compensating filters 36 and 38 may each be, as shown in FIG. 3, identical shunt L, C, R band stop filters which preferably have a high Q, for example of about one hundred.

The processed information and reference signals $x_1(t)$ and $y_1(t)$ are applied to a correlator 40, which may be of the type shown in the above mentioned Patent No. 3,036,-157. The output of the correlator 40 represents the value of the $2^0$ bit and is applied, together with the outputs of similar correlators in the channels which respectively extract the other bits $2^1$, $2^2$, - - - $2^n$, to sampling gate circuits 42. These sampling gate circuits may be AND gates of the type known in the art which are enabled by the output pulses from a pulse generator circuit 44. The pulse generator may include circuits such as multivibrators providing output pulses to the sampling gates having a period equal to the keying interval T, equal to the reciprocal of the given frequency, $f_d$. The pulse generator 44 is triggered by the given frequency tone produced by the divider 30.

The outputs of the sampling gates, indicated as $Z_1$ to $Z_n$, are applied to an output logic network 46. Logic circuits, each including oppositely polarized diodes 48 and 50 connected to resistors 52 and 54, are individually connected to each sampling gate output $Z_1$ to $Z_n$. Only the logic circuit for the $Z_1$ output is shown in detail to simplify the illustration. A positive $Z_1$ output level (with respect to a reference potential, such as ground) indicates a binary "1" bit of order $2^0$ while a negative $Z_1$ level indicates a binary "0" bit of order $2^0$. The value of the $2^0$ bit is therefore a binary "1" when a voltage appears across the resistor 52 in the output logic 46 or a binary "0" when a voltage appears the resistor 54.

The mode of operation of the illustrated system and the new results obtained therefrom may be still more apparent from the following discussion. Only the transmission and detection of the $2^0$ bit of the input information is taken by way of example. The same considerations are applicable to the remaining transmitted bits. At the transmitter, the reference signal is a sinusoidal function of time which may be expressed as $$r_1(t)=A \sin 2\pi f_{r_1} t \qquad (8)$$

The information signal may be expressed as $$s_1(t)=\pm A \sin 2\pi f_{s_1} t \qquad (9)$$

A is a constant which, in the case of the information signal, is positive when that signal is modulated to represent a binary "1" bit and negative when that signal is modulated to represent a binary "0" bit. If these signals $r_1(t)$ and $s_1(t)$ were correlated with each other over a number of cycles, say for the period of time $$T=\frac{1}{f_d}$$

the output of the correlator if normalized would be a positive value for a binary "1" bit and a negative value for a binary "0" bit.

When the information and reference signals are transmitted, as in the comunications system described above in connection with FIGS. 1 and 2, the signals are subject to amplitude and phase distortion as previously explained. Accordingly, the reference signal may be of the form $$x(t)=x_c \cos 2\pi f_0 t+x_s \sin 2\pi f_0 t \qquad (11)$$

and the information signal may be of the form $$y(t)=y_c \cos 2\pi f_0 t+y_s \sin 2\pi f_0 t \qquad (12)$$

Where $x_c$, $x_s$, $y_c$, and $y_s$ are constants and $f_0$ may be expressed by the following relationship $$f_0 \approx \frac{K}{T} \approx f_s \qquad (13)$$

when K is an integer and $$T=\frac{1}{f_d}$$

$f_0$ is approximately equal to $f_s$ for the system illustrated in FIGS. 1 and 2 when the functions $x(t)$ and $y(t)$ represent the signals at the inputs to the compensating filters 36 and 38 (FIG. 2). The relationship between $f_0$ and $f_s$ is only an approximate average value of the frequency of the components of the reference and information signals due to their random phase displacements during high frequency radio transmission between the transmitting and receiving terminals.

Let it be assumed that these signals $x(t)$ and $y(t)$ were correlated with each other, in the correlator 40, over the period of time T, without passing through the compensating filters 36 and 38. The output of the correlator would be $$Z_1=B[x_c y_c+x_s y_s] \qquad (14)$$

where B is a constant. Only those components of the reference and information signals at the frequency $f_0$ contribute to the output of the correlator. Should these components be in error due to distortion of the reference or information signals, the output of the correlator will erroneously indicate the value of the $2^0$ bit.

The compensating filters 36 and 38 effectively broaden the spectrum of the signals $r_1(t)$ and $s_1(t)$. An approximate Fourier series expansion of the signal produce by the compensating filters may be written as $$x_1(t)=\sum_k \left( x_{c_k} \cos \frac{2\pi K}{T} t + x_{s_k} \sin \frac{2\pi K}{T} t \right) \qquad (15)$$

$$y_1(t)=\sum_k \left( y_{c_k} \cos \frac{2\pi K}{T} t + x_{s_k} \sin \frac{2\pi K}{T} t \right) \qquad (16)$$

A far greater number of terms of the reference and information signals are therefore available for correlation in the correlator 40 than is the case when the compensating filters are not used. Of course, the terms of greatest significance will be in the frequency range of the signals where the power of the signals $r_1(t)$ and $s_1(t)$ is significant, that is over the spectrum of these signals about the $f_{s1}$ (see FIG. 4C). The fundamental frequency of the information and reference signals in the series expressed in Equations 15 and 16 depends upon the center frequency of the fading spectrum and the sampling period. The output of the correlator 40 therefore includes a large number of terms about $f_s$ and may be expressed as follows:

$$Z_1=B\sum_{k_{f_0}}(X_{c_k}Y_{c_k}+X_{s_k}Y_{s_k}) \quad (17)$$

Since a large number of components are correlated with each other in the correlation detection process, the effect obtained approximates a multiple order diversity reception where the order is equal to the number of terms having substantially the same strength or amplitude which are now contained in the spectrum about $f_0$.

Figure 6:
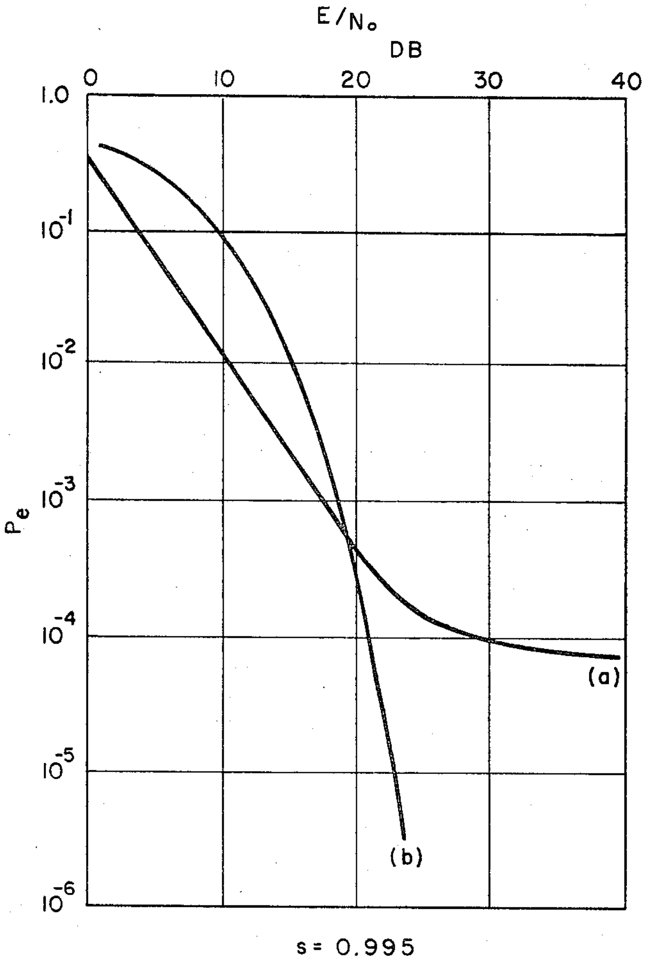
FIG. 6 is a graph showing the error probability characteristic of the system shown in FIGS. 1 and 2 both with and without the inclusion of the compensating filters therein.

A considerable improvement in error performance which is obtained through the use of the compensating filters is illustrated in FIG. 6. The graph is calibrated in terms of error probability normalized ($P_e$) and the abscissa is calibrated in terms of the ratio of signal energy to noise $E/N_0$ in decibel notation. $E/N_0$ is an experimentally derived term which is a measure of the signal-to-noise ratio of the communications system. Curve (a) in FIG. 6 represents the error probability without the use of the compensating filters. It will be observed that the error probability is limited to approximately a value of $10^{-4}$ in spite of increasing signal strentgh. The error probability characteristic of the system when the compensating filters are used is illustrated by curve (b). It will be observed that there is no limitation to the decrease in error probability with increasing signal strength. Accordingly, the reliability of the communication system is improved, particularly at high signal strength, by the use of the compensating filters. The foregoing charactertics are obtained in cases where the correlation coefficient $s$ of the system is relatively high which is normally the case in high frequency radio communication systems.

From the foregoing description it will be apparent that it has been providing improved communication system and an improved receiver for use in communication systems. The invention provides significant improvement in the error performance of communications systems, and particularly of digital communication systems of the frequency differential type, in the presence of fading and noise. While one embodiment of a communications system utilizing the invention has been described herein, variations and modifications, within the scope of the invention, will undoubtedly become apparent to those skilled in the art. Accordingly, the foregoing description should be taken as illustrative and not in any limiting sense.

What is claimed is:

1. A communications system comprising
   (a) means for transmitting a first signal which represents information as a function of the correlation between said first signal and a second signal, and
   (b) means for receiving said first signal including
      (1) means for broadening the spectrum of said received first signal, and
      (2) means for correlating said broadened spectrum first signal and said second signal with each other for deriving said information.

2. A communications system in which an information bearing signal is subjected to multipath and fading distortion during transmission comprising
   (a) means responsive to said signal after transmission for providing a first output the power of which is a certain function of the frequency of said signal over the spectrum of said signal,
   (b) a filter responsive to said first output providing a second output the power of which is modified in accordance with a function of frequency inverse to said certain function, and
   (c) means for correlating said second output and a reference signal with each other for deriving the information borne by said signal.

3. A communications system in which a signal is transmitted and during transmission is subject to fading and multipath distortion, said system comprising
   (a) means responsive to said transmitter signal for deriving a signal which varies as a certain function of frequency over the frequencies in the band of frequencies said signal occupies due to fading and multigraph distortion during transmission,
   (b) a filter having a transmission characteristic which as a function of frequency, is the inverse of said function, for processing said signal, and
   (c) correlation means responsive to said processed signal for deriving the information carried by said signal.

4. A communications system comprising
   (a) means for transmitting a pair of signals which repersent information according to the phase relationship therebetween,
   (b) means for processing said signals upon reception to broaden the frequency spectra thereof, and
   (c) means responsive to said signals after processing for correlating said signals with each other whereby to derive said information therefrom.

5. A communications system for transmitting information between transmitting and receiving terminals, said system comprising
   (a) means at said transmitting terminal for generating at least one pair of signals,
   (b) means at said transmitting terminal for modulating said signals to represent said information according to the phase relationship therebetween and for transmitting said signals after modulation,
   (c) means at said receiving point for individually processing said signals,
      (1) said processing means including a pair of filters each having a power transmission characteristic over the spectrum of said signals which is inversely related to the power spectrum of said signals, and
   (d) means at said receiving terminal for correlating said signals with each other after processing in said filters of said processing means whereby to derive said information.

6. A communications system for transmitting information between transmitting and receiving terminals, said system comprising
   (a) means at said transmitting terminal for generating at least one pair of signals,
   (b) means at said transmitting terminal for modulating said signals to represent said information according to the phase relationship therebetween and for transmitting said signals after modulation,
   (c) means at said receiving point for individually processing said signals,
      (1) said processing means including a pair of band stop filters each having the center of their stop band approximately at the center frequency of said signals, and
   (d) means at said receiving terminal for correlating said signals with each other after processing in said filters of said processing means whereby to derive said information.

7. A communications system for transmitting information from a transmitting terminal to a receiving terminal, said system comprising
   (a) means at said transmitting terminal for generating at least one pair of signals,
   (b) means at said transmitting terminal for modulating at least one of said signals to represent information in accordance with the phase relationship between said pair of signals, (c) means at said transmitting terminal for transmitting said pair of signals, (d) means at said receiving terminal for separately deriving said pair of signals, said pair of signals at said receiving terminal each having a spectrum of frequencies, (e) a pair of band stop filters each for passing a separate one of said signals, each of said filters having a power transmission characteristic over the spectra of said signals which is approximately inversely related to the variations in power with frequency of the said signals, and (f) correlation means at said receiving terminal operatively coupled to said filters and responsive to said pair of signals passed by said filters for providing an output representing said information.

8. A communications system for transmitting information from a transmitting terminal to a receiving terminal, said system comprising (a) means at said transmitting terminal for generating at least one pair of signals having frequencies which are different harmonics of a given frequency, (b) means at said transmitting terminal for modulating at least one of said signals at a rate which is an integral multiple of said given frequency to represent said information in accordance with the phase relationship between said pair of signals, (c) means at said transmitting terminal for transmitting said pair of signals, (d) means at said receiving terminal for separately deriving said pair of signals, and also a reference signal having said given frequency, said pair of signals at said receiving terminal each having a spectrum of frequencies and each of which varies in power with frequency over their respective spectra, (e) a pair of filters each for passing a separate one of said signals, each of said filters having a power transmission characteristic over the spectrum of said signals which is approximately inversely related to the variations in power with frequency said signals, (f) a correlator at said receiving terminal operatively input coupled to said filters responsive to said pair of signals passed by said filters for providing an output representing said information, and (g) means for sampling said output at said rate to derive said information.

9. A communications system for transmitting digital information from a transmitting terminal to a receiving terminal comprising (a) means for generating at said transmitting terminal a plurality of signals each of which is a different harmonic frequency of a given frequency substantially lower than the frequency of the lowest frequency one of said plurality of signals, (b) means at said transmitting terminal for modulating certain of said plurality of signals for respectively representing different bits of said information in accordance with the phase relationships between different ones of said certain signals and at least one of the others of said plurality of signals which provides a reference, (c) means also at said transmitting terminal for transmitting said certain signals and said reference signal, (d) a plurality of channels at said receiving terminal each for a different pair of said reference and certain signals, (e) means in each of said channels responsive to a signal of said given frequency for translating the frequency of one of the reference and certain signals transmitted by said channel to the same frequency, (f) band-stop filters in each of said channels for attenuating signals over a spectrum centered at said same frequency, said reference and certain frequency signals being passed through said filters, (g) correlator in each of said channels for correlating said reference and certain frequency signals with each other after said signals have passed through said filters, each of said correlators having a separate output, and (h) means for sampling the outputs of said correlators for discrete intervals related to the reciprocal of said given frequency to derive said information.

10. A communications system for transmitting digital information in the form of binary bits, said system comprising (a) means for transmitting an information signal and a reference signal which have frequencies which are integral multiples of a given frequency numerically larger than the rate of arrival of successive ones of said bits, bits of opposite value being respectively represented by the absence and presence of a reversal in phase of said information signal for a given period of time related to the reciprocal of said given frequency, (b) means for receiving said signals and translating them to the same frequency, (c) signal processing means for broadening the spectra of each of said signals of said same frequency including a pair of band-stop filters each for passing a different one of said same frequency signals, (d) means for correlating the signals passed by said filters with each other to provide an output indicative of the value of said bits, and (e) means for sampling said output at successive intervals equal to said given period to provide successive outputs representing said successive ones of said bits.

11. A communications system for transmitting information in the form of successive groups of binary bits, which arrive at a transmitting terminal at a certain rate, from said transmitting terminal to a receiving terminal, said system comprising (a) means for generating at said transmitting terminal a plurality of signals each having a frequency which is a successively higher harmonic of a given frequency higher numerically than said certain rate, (b) different ones of said plurality of signals having frequencies intermediate the frequencies of said reference signals and providing information signals, (c) means for modulating said information signals in accordance with said information for selectively transmitting said signals with and without reversal in phase for a certain duration of time to respectively represent said bits of said information of opposite value, said certain duration of time being at least equal to the reciprocal of said given frequency, (d) means for transmitting said modulated information signals and said reference signals to said receiving terminal on a common carrier over a communication link which subjects said signals to fading and multipath distortions, (e) means at said receiving terminal for detecting said information and reference signals and translating one of said information signals and reference signals in frequency so that said reference signals and information signals which are adjacent in frequency to each other have the same frequency, (f) a plurality of similar compensating filters coupled to said detecting means each for passing a different one of said translated, same frequency reference and information signals, said filters having a power transmission characteristic over the frequency spectrum of said signals which is an inversely related to the variation in power with frequency over said spectrum of said signals themselves, (g) a plurality of correlators, each for correlating a different one of said information signals which pass through said filters and a different one of said reference signals which pass through said filters having the same frequency as said information signal with each other, said correlators providing outputs indicative of the values of said bits, (h) means for sampling said outputs at intervals of time equal to the reciprocal of said given frequency, and (i) output logic responsive to the polarity of said sampled outputs for deriving said bits.

References Cited

UNITED STATES PATENTS

| | | | |
|---|---|---|---|
| 2,982,853 | 5/1961 | Price et al. | 235—56 X |
| 3,036,157 | 5/1962 | Franco et al, | 178—67 |
| 3,145,341 | 8/1964 | Andrew | 325—472 |
| 3,168,699 | 2/1965 | Sunstein et al. | 325—472 |

ROBERT L. GRIFFIN, *Primary Examiner.*

R. MURRAY, *Assistant Examiner.*